US012591910B1

(12) United States Patent
Saur

(10) Patent No.: US 12,591,910 B1
(45) Date of Patent: Mar. 31, 2026

(54) DIGITAL SALES EXPERIENCE PLATFORM

(71) Applicant: SalesAIR LLC, Greensboro, NC (US)

(72) Inventor: Benjamin Saur, Greensboro, NC (US)

( * ) Notice: Subject to any disclaimer, the term of this patent is extended or adjusted under 35 U.S.C. 154(b) by 0 days.

(21) Appl. No.: 18/242,024

(22) Filed: Sep. 5, 2023

Related U.S. Application Data

(60) Provisional application No. 63/403,816, filed on Sep. 5, 2022.

(51) Int. Cl.
    *G06Q 30/0251*    (2023.01)
    *G06Q 30/0241*    (2023.01)
    *G06Q 30/0242*    (2023.01)

(52) U.S. Cl.
    CPC ..... *G06Q 30/0257* (2013.01); *G06Q 30/0242* (2013.01); *G06Q 30/0277* (2013.01)

(58) Field of Classification Search
    CPC ........... G06Q 30/0257; G06Q 30/0242; G06Q 30/0277
    USPC ............................... 705/14.41, 14.54, 14.25
    See application file for complete search history.

(56) References Cited

U.S. PATENT DOCUMENTS

| | | | | |
|---|---|---|---|---|
| 2007/0027760 A1* | 2/2007 | Collins | .............. | G06Q 30/0243 |
| | | | | 705/14.54 |
| 2008/0033807 A1* | 2/2008 | Black | ................. | G06Q 30/0248 |
| | | | | 705/14.47 |
| 2009/0030781 A1* | 1/2009 | Mehta | ................ | G06Q 30/0276 |
| | | | | 705/14.72 |
| 2015/0127445 A1* | 5/2015 | Jaffee | ................. | G06Q 30/0224 |
| | | | | 705/14.25 |
| 2016/0162954 A1* | 6/2016 | Kang | ................. | G06Q 30/0226 |
| | | | | 705/14.27 |
| 2020/0218762 A1* | 7/2020 | Jain | ..................... | G06Q 30/0621 |
| 2022/0038757 A1* | 2/2022 | Ghavami | ............. | H04N 21/458 |

OTHER PUBLICATIONS

Monica Lara, 5 ingredients for creating content to personalize experiences, 2019 (Year: 2019).*

* cited by examiner

*Primary Examiner* — Tarek Elchanti

(74) *Attorney, Agent, or Firm* — MacCord Mason PLLC

(57) ABSTRACT

A customized sales program and methodology. In one embodiment, a system provides a graphical user interface to enable a customized sales experience, and generating a customizable module to create the customized sales experience. The result is a hybrid customized sales experience.

4 Claims, 15 Drawing Sheets

DIGITAL SALES EXPERIENCE PLATFORM

BACKGROUND

This application claims the benefit of U.S. provisional application No. 63/403,816, filed Sep. 5, 2022, which is incorporated herein by reference in its entirety.

FIELD

The present inventions are directed to systems for digital sales, and more particularly, to improved sales experience and web-based information sharing systems and methods.

BRIEF DESCRIPTION OF THE DRAWINGS

FIG. 3I is a partially exploded view of a sales experience editor display according to a close products highlights feature introduced in FIG. 3;

SUMMARY

Figure 1:
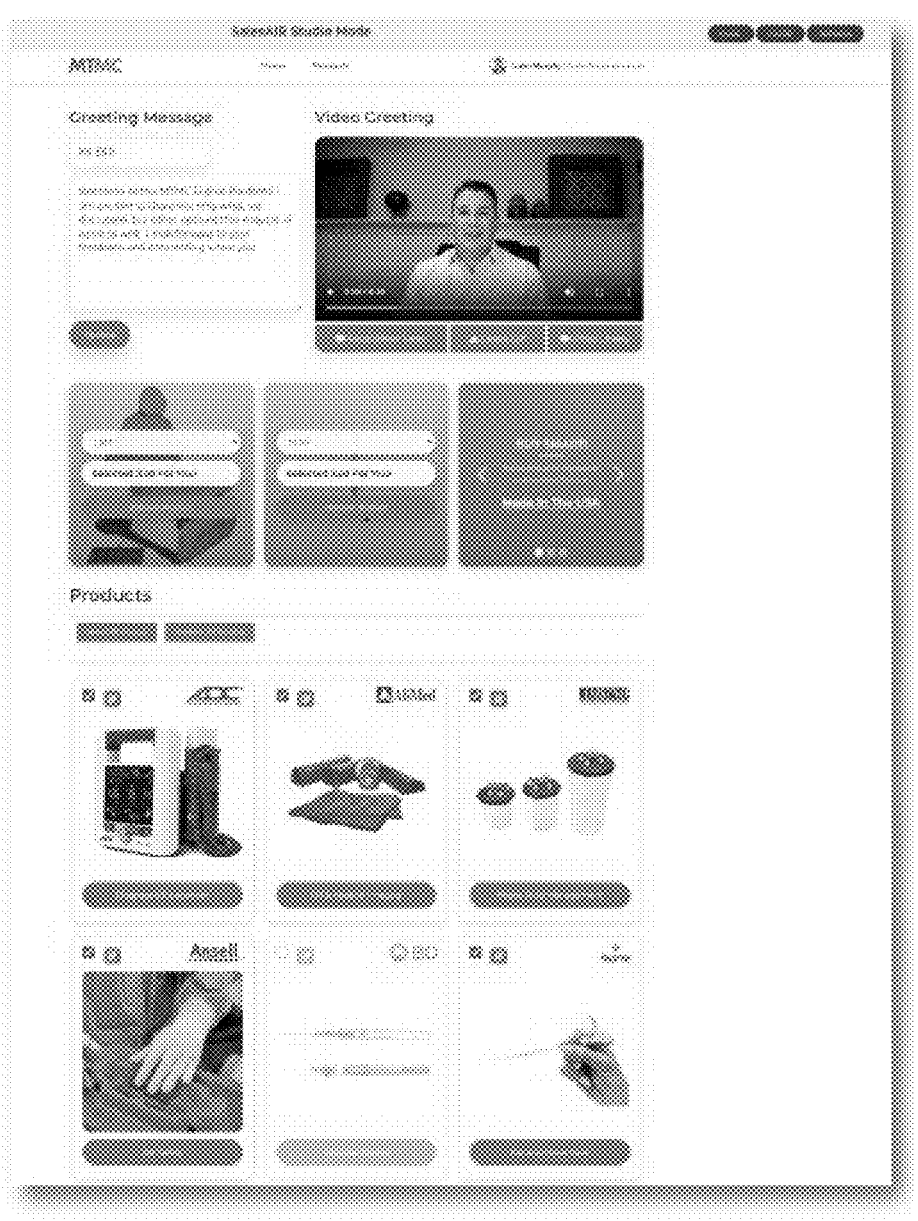
FIG. 1 is a view of a studio mode display according to one embodiment of the disclosure.

Applicant desires a sales program, system, assembly, and method of use without the drawbacks presented by the traditional systems and methods. Those skilled in the art having the benefit of this disclosure will recognize additional features, advantages over conventional systems, and improvements within the spirit of these inventions.

In accordance with the present inventions, customizable sales platforms and methods are provided for assisting and transforming alternative content control and sales platforms.

These inventions provide an improved hybrid program and system that is convenient, efficient, and transparent for the content provider, end-user, and/or support providers, particularly when used in creating and delivering a customized sales platform for a tailored end-user interactive experience.

In one embodiment, a system enabling customized transactions with prospective end-users comprises a sales module having a customized content per platform experience; and a content provider module adapted to customize said content per platform experience, and having a plurality of display preferences and a plurality of adjustable content segments through a graphic and media tool targeted for at least one end-user interface, and wherein said content provider module includes a web-based interface studio mode to transform a plurality of content into said content per platform experience and adapted to modify said plurality of display and content segments for an interactive user interface, and having a user sharing feature, and wherein said studio mode includes a backend analytics node.

In certain examples, the studio node may include an associated page preview display. The studio mode may include a preselected page preview display presentation having at least a portion of said content per platform experience prior to delivery to provide a content edit decision. The studio mode may include a greeting message generation having a text field adapted to receive a customizable message. The studio mode may include a video greeting generation and a graphic interchange format creator node. The studio mode may include a video library, a product highlight arrangement node, and a custom content exhibit.

In one embodiment, a system enabling customized transactions with prospective end-users comprises a sales module delivering a customizable content per platform experience; and a content provider module adapted to customize said content per platform experience, and wherein said interactive system creating a plurality of display preferences and a plurality of adjustable content segments through graphic and media tools targeted for at least one end-user interface.

In certain examples, the studio mode may include a backend analytics node. The sales module may transform at least one platform landing page. The content provider module may include a tailored experience editor node. The tailored experience editor node may include a viewer invitation selection adapted to invite a distinct third party user to view a specific platform instance. The tailored experience editor node may include a navigate to supplier view prompt. The tailored experience editor node may include a navigate to supplier feature. The tailored experience editor node may include at least one selection chosen from the group consisting of a navigate to products selection, an open product highlights selection, a close product highlights selection, and a combination thereof.

In one embodiment, an assembly enabling customized transactions with prospective end-users comprises a deployed interactive application accessible from a corresponding prospective interactive user interface; a content provider adapted to provide a customized experience utilized by said deployed application, wherein said content provider personalizes an interaction with said prospective interactive user interface; and a plurality of analytics and characteristics of preselected product information adapted to transform said deployed interactive application for said prospective interactive user interface interaction.

In certain examples, the prospective customer interactive interaction may be personalized by at least one chosen from the group consisting of an individual prospective customer data, a group prospective customer data, a plurality of extracted data, a runtime asset, a product advertising material, and a combination thereof. The assembly may include a studio mode adapted to modify a plurality of display and content segments. The studio mode may include a backend analytics node. The assembly may include a user sharing feature. The assembly may include an electronic messaging communication.

In one embodiment, a method comprises providing a deployed interactive application being accessible from a prospective interactive user interface; enabling a content provider to configure a customized experience utilized by the deployed application to personalize an interaction with the prospective interactive user interface; and transforming the deployed application for the prospective interactive user interface interaction with a plurality of analytics and characteristics of preselected product information.

In certain examples, the prospective customer interactive interaction being personalized by individual prospective customer data. The method may include the prospective customer interactive interaction being personalized by group prospective customer data. The method may include the prospective customer interactive interaction being personalized by a plurality of extracted data. The method may include the prospective customer interactive interaction being personalized by runtime assets. The method may include the prospective customer interactive interaction being personalized by supplier, offering, and/or product advertising material. The method may include transforming content in a studio mode to modify a plurality of display and content segments. The method may include transforming a plurality of content into the content per platform experience. The method may include creating a user sharing feature. The method may include creating an electronic messaging communication. The method may include delivering targeted information to an individual recipient. The method may include delivering targeted information to a plurality of recipients.

In certain examples, the method may include modifying an associated page preview display. The method may include displaying a page preview presentation. The method may include generating a greeting message. The method may include generating a video greeting. The method may include accessing a video recorder adapted for providing a customized video. The method may include accessing a graphic interchange format creator node. The method may include creating a graphic interchange format image from a video selection. The method may include delivering of the graphic interchange format image from the video selection in a customized message. The method may include providing a video library. The method may include managing a selection of previously recorded videos. The method may include manipulating a product highlight arrangement node. The method may include establishing a key message presentation. The method may include providing a custom content exhibit. The method may include controlling a display of a preselected content element. The method may include concealing a particular content element.

In certain examples, the method may include applying a backend analytics node. The method may include tracking a customizable content per platform experience. The method may include transforming at least one platform landing page. The method may include dictating a plurality of customized options based on an end-user. The method may include providing a tailored experience editor node. The method may include establishing at least one customized video time parameter. The method may include establishing a plurality of customized video time parameters.

In certain examples, the method may include managing a navigate-to-top prompt. The method may include managing navigate-to-bottom prompt. The method may include manipulating a viewer invitation selection. The method may include inviting a distinct third party user to view a specific platform instance. The method may include connecting a navigate to supplier view prompt. The method may include connecting a navigate to supplier feature. The method may include connecting a navigate to products selection. The method may include connecting an open product highlights selection.

The method may include connecting a close product highlights selection. The method may include receiving an indication of a purchase of a product or service. In one embodiment, a system for enabling customized transactions with prospective end-users comprises a sales module delivering a customizable content per platform experience; and a content provider module adapted to customize the content per platform experience, and wherein the interactive system creating a plurality of display preferences and a plurality of adjustable content segments through graphic and media tools targeted for at least one end-user interface.

In certain examples, the content provider module may include a studio mode to modify the plurality of display and content segments for an interactive user interface. The studio mode may transform a plurality of content into the content per platform experience. The studio mode may be a web-based interface and having a user sharing feature. The user sharing feature may include an electronic messaging communication. The user sharing feature may deliver targeted information to an individual recipient. The user sharing feature may deliver targeted information to a plurality of recipients.

In certain examples, the studio mode includes an associated page preview display. The studio mode may include a preselected page preview display presentation. The page preview may display at least a portion of the content per platform experience prior to delivery to provide a content edit decision. The studio mode may include a greeting message generation. The greeting message may include providing a text field adapted to receive a customizable message. The system may include a targeted message per customized experience instance. The studio mode may include a video greeting generation. The video greeting generation may include a video recorder adapted for providing a customized video. The customized video may include a recorded per customized experience instance. The studio mode may include a graphic interchange format creator node. The graphic interchange format creator node may create a graphic interchange format image from a video selection.

In certain examples, the system may include a delivery of the graphic interchange format image from the video selection in a customized message. The studio mode may include a video library. The video library may provide a preselected selection of previously recorded videos. The selection of previously recorded videos may be based on a per user basis, plurality of user basis, and a combination thereof. The studio mode may include a product highlight arrangement node. The product highlight arrangement node may include a key message presentation. The system may include a key message-focused presentation based on a per instance basis. The studio mode may include a custom content exhibit. The custom content exhibit may display a particular content element. The system may include displaying the particular content element on a per instance basis. The custom content exhibit may conceal a particular content element. The system may include concealing the particular content element on a per instance basis.

In certain examples, the studio mode includes a backend analytics node. The backend analytics node may include a user-experience tracking of the customizable content per platform experience. The sales module may transform at least one platform landing page. The platform landing page may include a plurality of targeted viewer content. The system may include targeted viewer content being dictated by customized options based on the end-user. The content provider module may include a tailored experience editor node. The tailored experience editor node may establish at least one customized video time parameter. The system may include establishing a plurality of customized video time parameters. The tailored experience editor node may include a navigate-to-top prompt. The system navigate-to-top prompt may direct a user presentation to an upper portion of a supplier page content. The tailored experience editor node may include a navigate-to-bottom prompt. The navigate-to-bottom prompt may direct a user presentation to a lower portion of a supplier page content. The tailored experience editor node may include a viewer invitation selection. The viewer invitation selection may invite a distinct third party user to view a specific platform instance. The tailored experience editor node may include a navigate to supplier view prompt. The navigate to supplier view prompt may direct the view to a predesignated supplier video. The navigate to supplier view prompt may direct the view to a predesignated supplier promotion.

In certain examples, the tailored experience editor node includes a navigate to supplier features. The tailored experience editor node may include a navigate to products selection. The tailored experience editor node may include an open product highlights selection. The system tailored experience editor node may include a close product highlights selection. The system may include a return feature to deliver the user to a supplier page.

In one embodiment, a method comprises providing a graphical user interface to enable a customized sales experience via a selection of one or more graphical elements; and generating a customizable module adapted to create the customized sales experience.

In certain examples, the method may include transforming content in a studio mode to modify a plurality of display and content segments. The method may include transforming a plurality of content into the content per platform experience. The method may include creating a user sharing feature. The method may include creating an electronic messaging communication. The method may include delivering targeted information to an individual recipient. The method may include delivering targeted information to a plurality of recipients. The method may include modifying an associated page preview display. The method may include displaying a page preview presentation. The method may include generating a greeting message. The method may include generating a video greeting. The method may include accessing a video recorder adapted for providing a customized video.

In certain examples, the method may include accessing a graphic interchange format creator node. The method may include creating a graphic interchange format image from a video selection. The method may include delivering of the graphic interchange format image from the video selection in a customized message. The method may include providing a video library. The method may include managing a selection of previously recorded videos. The method of may include manipulating a product highlight arrangement node. The method may include establishing a key message presentation. The method may include providing a custom content exhibit. The method may include controlling a display of a preselected content element. The method may include concealing a particular content element. The method of may include applying a backend analytics node. The method may include tracking a customizable content per platform experience. The method may include transforming at least one platform landing page. The method may include dictating a plurality of customized options based on an end-user.

In certain examples, the method may include providing a tailored experience editor node. The method may include establishing at least one customized video time parameter. The method may include establishing a plurality of customized video time parameters. The method may include managing a navigate-to-top prompt. The method may include managing navigate-to-bottom prompt. The method may include manipulating a viewer invitation selection. The method may include inviting a distinct third party user to view a specific platform instance. The method may include connecting a navigate to supplier view prompt. The method may include connecting a navigate to supplier feature. The method may include connecting a navigate to products selection. The may include connecting an open product highlights selection. The method may include connecting a close product highlights selection. The may include receiving an indication of a purchase of a product or service.

In one embodiment, a system includes one or more of developing studio mode; generating a plurality of customer options; establishing a customer portal having a customer communication interface; and providing a third party communication interface.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

DETAILED DESCRIPTION

In the following description, like reference characters designate like or corresponding parts throughout any views. Also in the following description, it is to be understood that such terms as "forward," "rearward," "left," "right," "upwardly," "downwardly," and the like are words of convenience and are not to be construed as limiting terms.

Referring now to the disclosure in general, those of ordinary skill in the art having the benefit of this disclosure will recognize several key programs to enhance targeted sales performance efforts and customized sales experience platforms, for instance interactive concepts aimed specifically to a targeted end-user. Those skilled in the art having the benefit of this disclosure will recognize additional scaling, device and technology applications, and user communication arrangements within the spirit of this disclosure.

As shown and described herein in FIGS. 1-5, a method may include providing a graphical user interface to enable a customized sales experience via a selection of one or more graphical elements, including any of the graphical user interface examples shown and described herein; and generating a customizable module adapted to create the customized sales experience, including any of the customizable module examples shown and described herein.

As shown and described herein in FIGS. 1-5, a system for enabling customized transactions with prospective end-users comprises a sales module delivering a customizable content per platform experience, including any of the sales module examples shown and described herein; and a content provider module adapted to customize the content per platform experience, including any of the content provider module examples shown and described herein. Typically the system is an interactive system creating a plurality of display preferences and a plurality of adjustable content segments through graphic and media tools, for instance targeted for at least one end-user interface.

As shown and described herein in FIGS. 1-5, a method may include providing a deployed interactive application that is generally accessible from a prospective interactive user interface, including any of the deployed interactive application examples shown and described herein; enabling a content provider to configure a customized experience utilized by the deployed application to personalize an interaction with the prospective interactive user interface, including any of the customized experience examples shown and described herein; and transforming the deployed application for the prospective interactive user interface interaction with a plurality of analytics and characteristics of preselected product information, including any of the deployed applications shown and described herein.

Figure 1A:
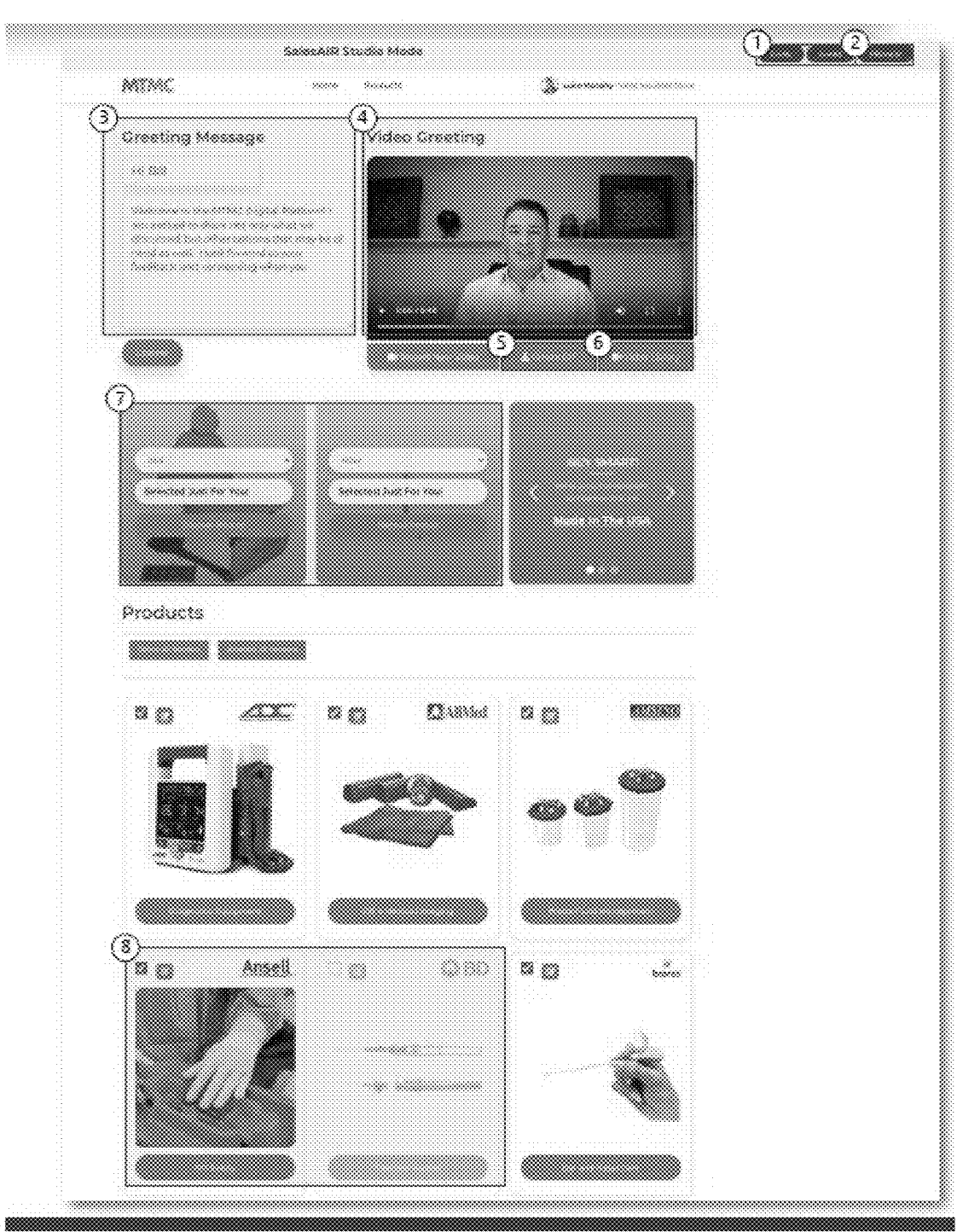
FIG. 1A is a partially exploded view of a studio mode display according FIG. 1.
Figure 2:
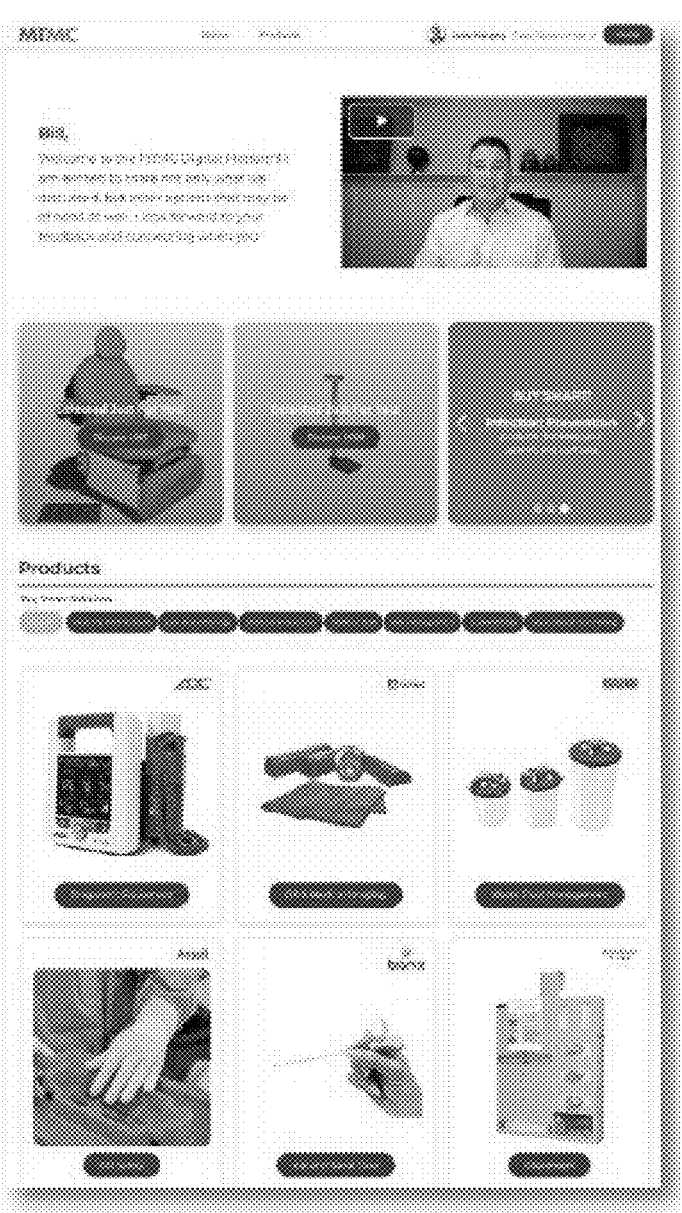
FIG. 2 is a view of a platform landing page display according to one embodiment of the disclosure.
Figure 3:
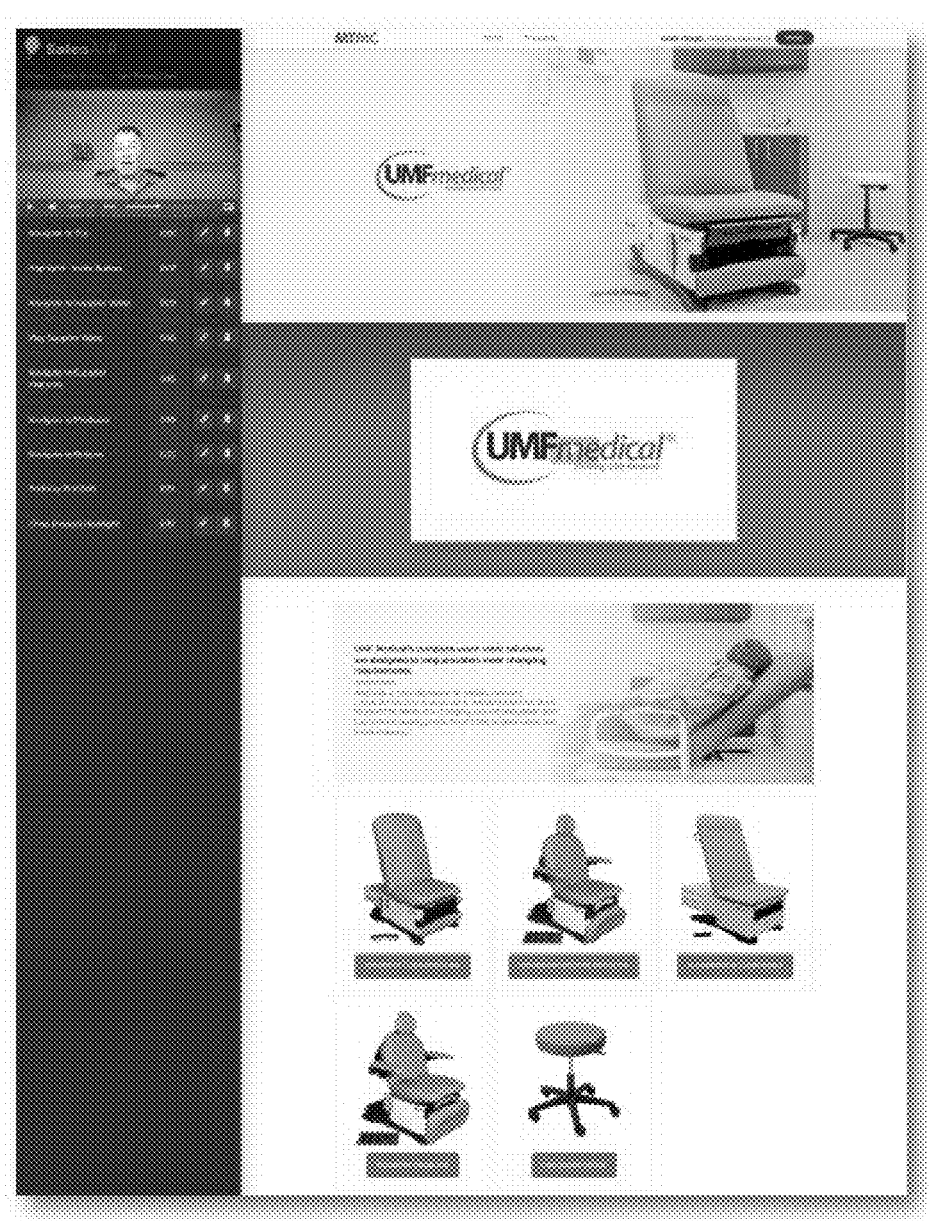
FIG. 3 is a view of a sales experience editor display according to one embodiment of the disclosure.
Figure 3A:
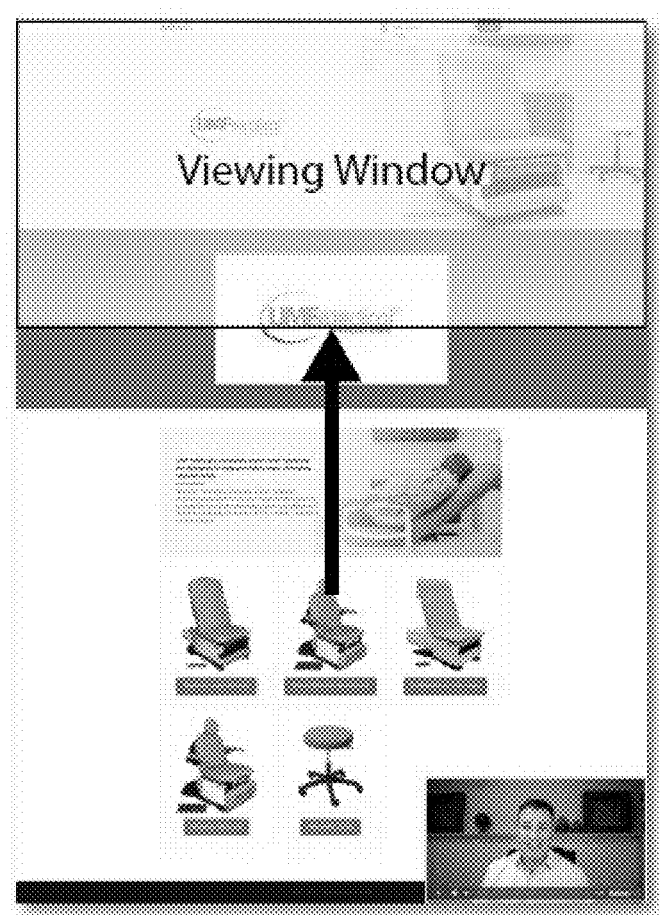
FIG. 3A is a partially exploded view of a sales experience editor display according to a navigate to top feature introduced in FIG. 3.
Figure 3B:
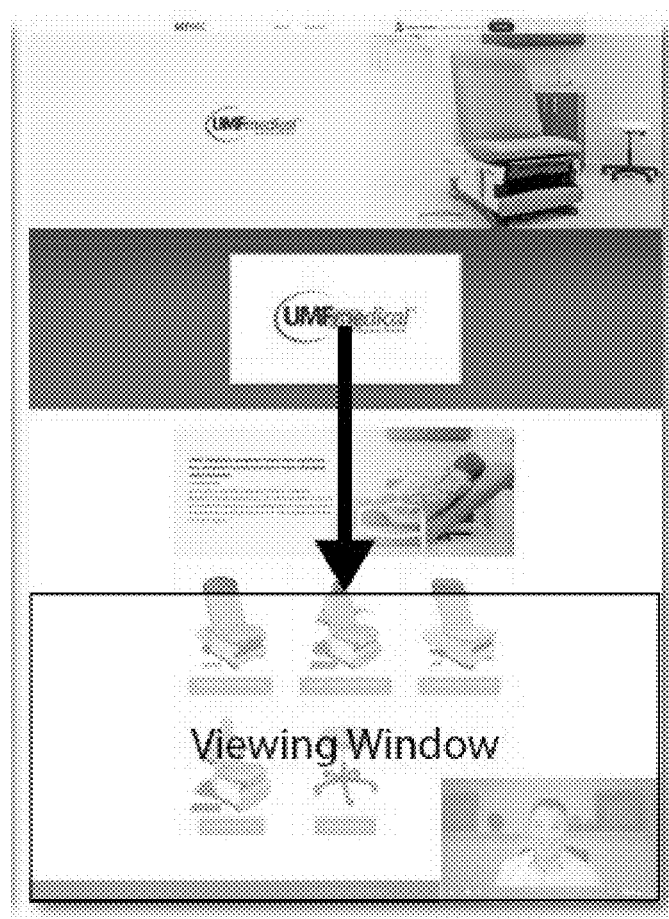
FIG. 3B is a partially exploded view of a sales experience editor display according to a navigate to bottom feature introduced in FIG. 3.
Figure 3C:
FIG. 3C is a partially exploded view of a sales experience editor display according to a highlight, for instance invite button, feature introduced in FIG. 3.
Figure 3D:
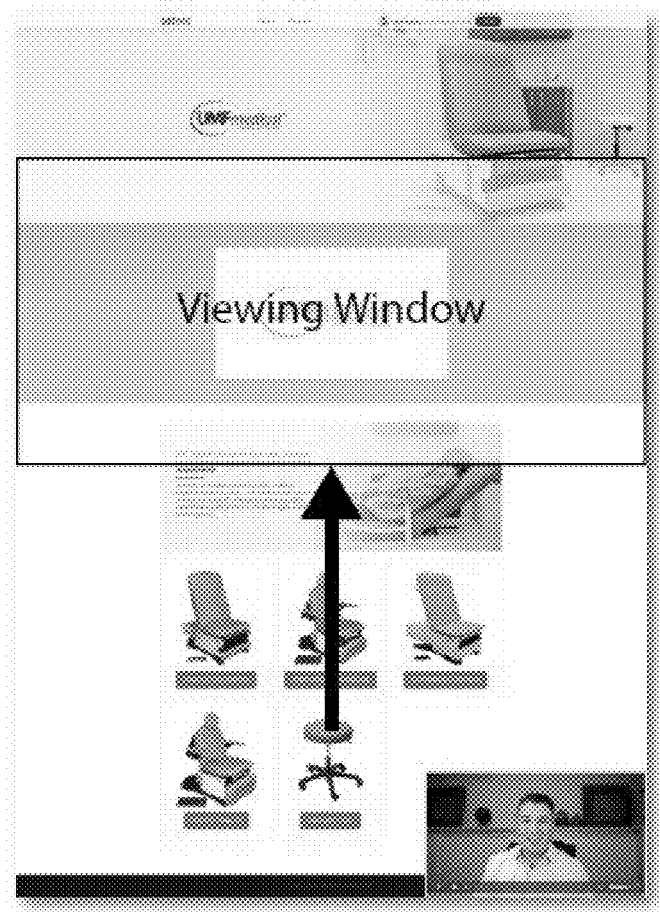
FIG. 3D is a partially exploded view of a sales experience editor display according to a navigate to supplier video feature introduced in FIG. 3.
Figure 3E:
FIG. 3E is a partially exploded view of a sales experience editor display according to a play supplier video feature introduced in FIG. 3.
Figure 3F:
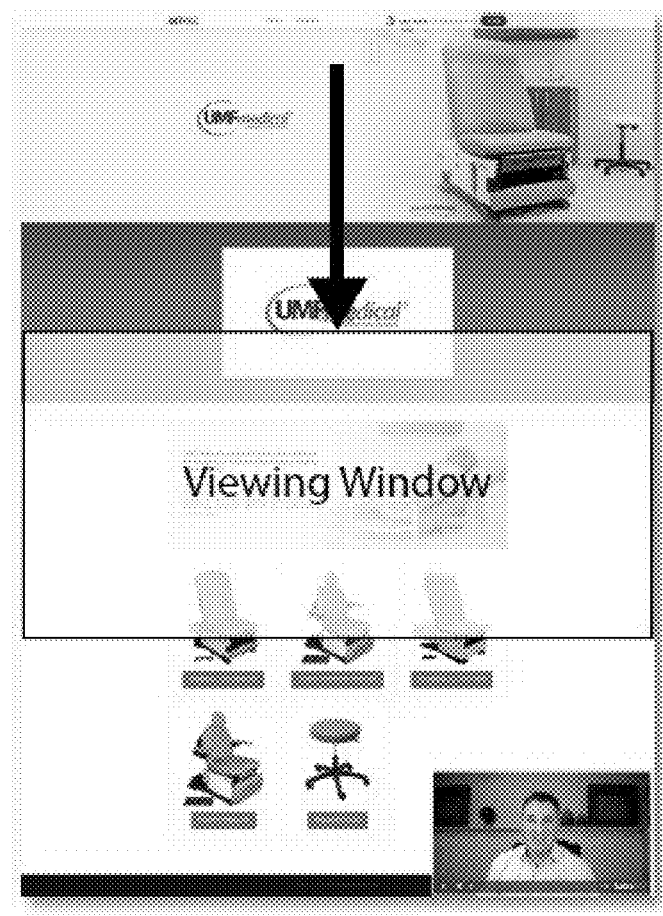
FIG. 3F is a partially exploded view of a sales experience editor display according to a navigate to supplier features introduced in FIG. 3.
Figure 3G:
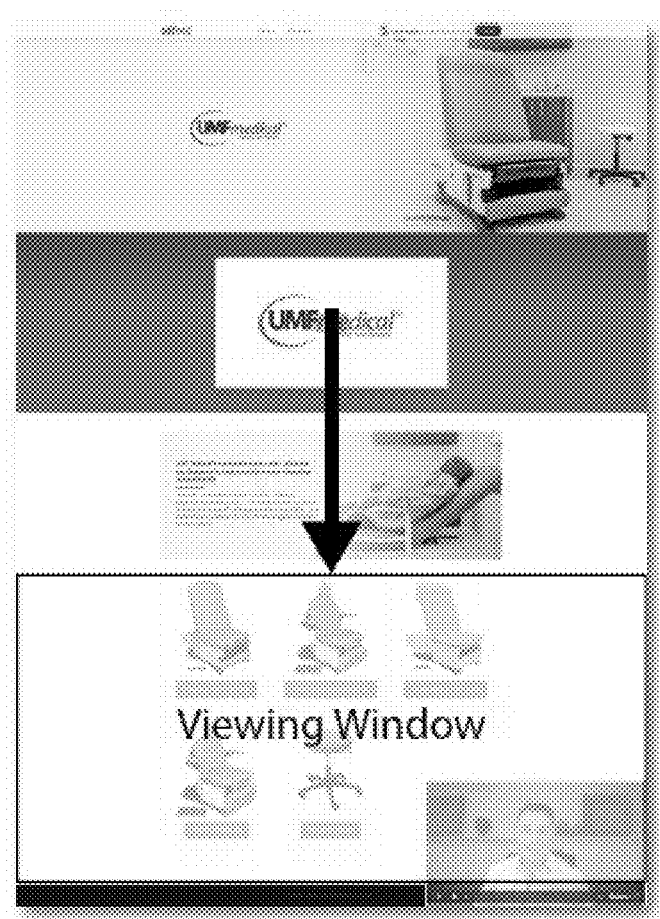
FIG. 3G is a partially exploded view of a sales experience editor display according to a navigate to products feature introduced in FIG. 3.
Figure 3H:
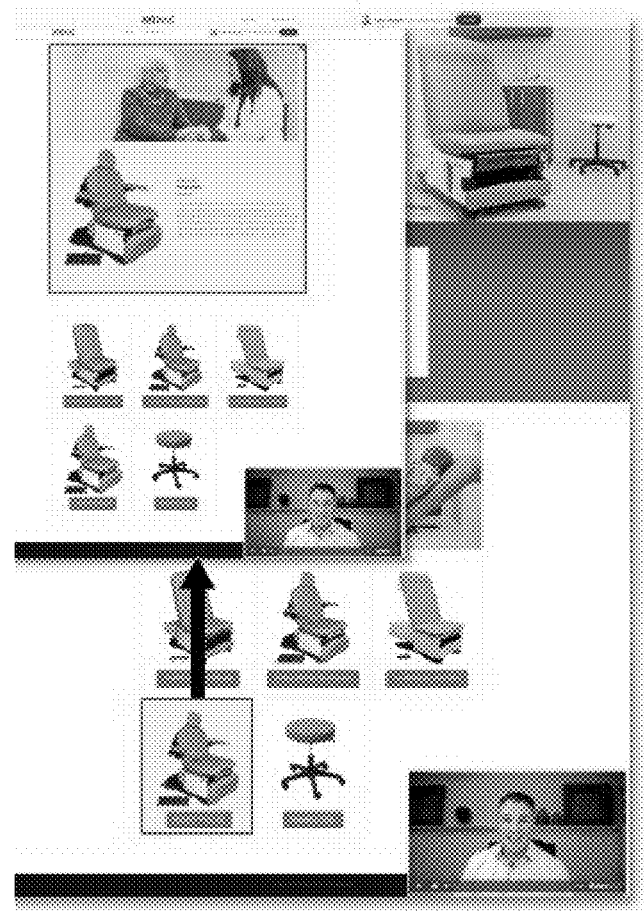
FIG. 3H is a partially exploded view of a sales experience editor display according to an open products highlights feature introduced in FIG. 3.
Figure 31:
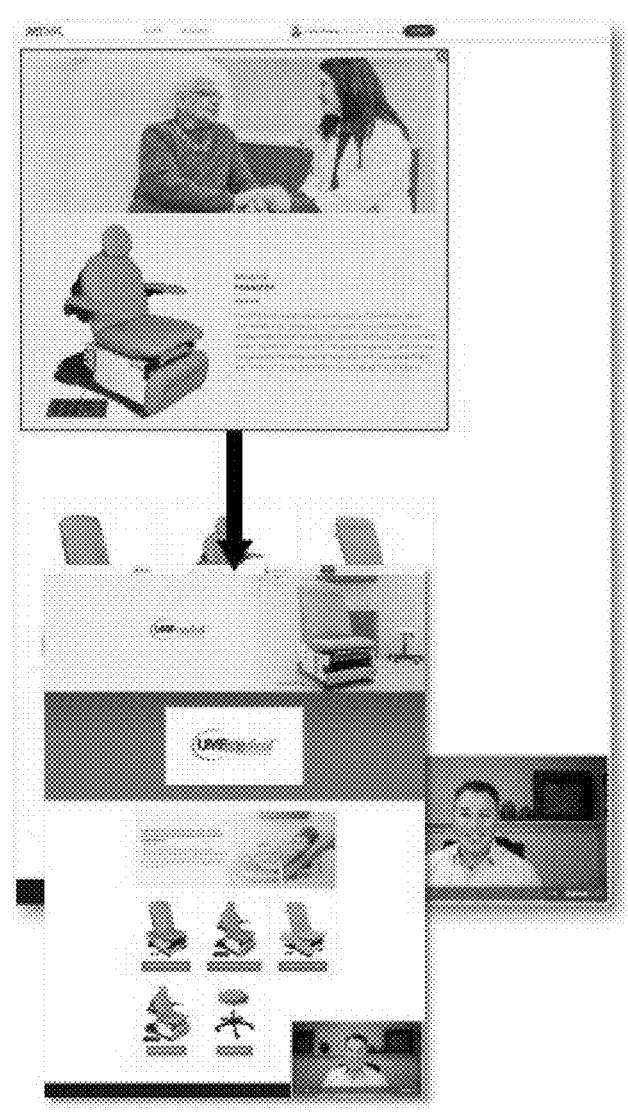
Figure 4:
FIG. 4 is a view of a supplier profile display according to one embodiment of the disclosure.
Figure 5:
FIG. 5 is a view of a supplier product page display according to one embodiment of the disclosure.

FIGS. 1 and 1A introduce a customizable sales studio mode and interactive module components that enable content providers to tailor any of the embodiments herein for downstream prospective customer end-users to interact with the system and engage transactions. For instance, the customizable sales studio mode may allow the content provider to set customized content per platform instance, including, but not limited to, delivery to individual or group end-users and/or tracking any of the backend analytics shown and described herein. FIGS. 1-1A further introduce a customizable sales platform and interactive module components that enable content providers to tailor any of the embodiments herein for downstream prospective customer end-users to interact with the system and engage transactions. FIG. 2 introduces a landing page embodiment of the platform instance, wherein content is dictated by any of the customization options shown and described herein. FIGS. 3-3I illustrate a variety of sales experience editor display examples and embodiments shown and described herein. Those skilled in the art having the benefit of this disclosure will recognize additional scaling, device and technology applications, and user communication arrangements within the spirit of this disclosure.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What I claim is:

1. A computer-readable device storing instructions that, when executed by a computer system having a memory and a processor, cause said computer system to perform operations for enabling customized digital content transactions with prospective end-users, said operations comprising:

a. generating, by a sales module executed on said processor, customized content per platform experience by dynamically adapting digital assets using a platform-specific rule set, said rule set comprising at least one device type, end-user characteristics, and content delivery context, wherein said generating includes automatically formatting and rendering digital assets into platform-compliant display objects for presentation on user devices; and receiving by a content provider module operatively coupled to said sales module, a workflow comprising a plurality of content customization parameters, said content provider module adapted to render said customized content-per-platform experience by programmatically modifying display preferences and adjustable content segments through, a graphic and media tool, and wherein said content provider module provides a web-based interface studio mode that (i) transforms received content data into platform-renderable objects, (ii) generates a preview display of said customized content-per-platform experience in real time in response to user selections of content elements, (iii) receives configuration data specifying electronic messaging communication parameters, and (iv) generates targeted electronic messages including links to said customized content-per-platform experience for delivery to a plurality of recipients c. displaying, on a client device, a dynamically updated preview presentation comprising at least a portion of said customized content-per-platform experience prior to delivery, wherein said preview presentation is automatically refreshed in response to user input to provide real-time edit decisions, and wherein said system applies backend analytics to track preview interactions and generate engagement metrics stored in the memory for subsequent modification of said customized content-per-platform experience and d. tracking, by a backend analytics node operatively coupled to said memory, real-time user interactions with said customized content-per-platform experience, said backend analytics node adapted to generate and store engagement metrics in said memory, wherein said stored engagement metrics are utilized for subsequent modification and user-experience optimization of said customized content-per-platform experience.

2. The operations of claim 1, wherein said studio mode includes a greeting message generation having a text field adapted to receive a customizable message and executable instructions to generate and store a targeted electronic message associated with a customized content-per-platform experience instance, wherein the system automatically renders said message within a preview interface prior to transmission.

3. The operations of claim 1, wherein said studio mode includes a video greeting generation comprising (i) a video recorder node adapted to capture and store a customized video greeting in memory, and (ii) a graphic interchange format (GIF) creator node adapted to automatically convert at least a portion of said video greeting into a GIF file and embed said GIF file into a customized electronic message for delivery.

4. The operations of claim 1, wherein said studio mode includes a video library, wherein said video library comprising (i) a video library storing a preselected set of previously recorded videos accessible for reuse in customized content-per-platform experiences, (ii) a product high-light arrangement node adapted to programmatically generate a key message presentation by sequencing product highlight assets, and (iii) a custom content exhibit module adapted to selectively render or conceal designated content elements within the end-user interface in response to content provider input.

\* \* \* \* \*